United States Patent [19]

Masreliez

[11] Patent Number: 5,089,996
[45] Date of Patent: Feb. 18, 1992

[54] TRANSDUCER DEVICE FOR ACOUSTIC LOG

[75] Inventor: Karl-Gustav Masreliez, Stockholm, Sweden

[73] Assignee: Consilium Marine AB, Stockholm, Sweden

[21] Appl. No.: 488,039

[22] PCT Filed: Oct. 31, 1988

[86] PCT No.: PCT/SE88/00585
§ 371 Date: Jul. 23, 1990
§ 102(e) Date: Jul. 23, 1990

[87] PCT Pub. No.: WO89/04975
PCT Pub. Date: Jun. 1, 1989

[30] Foreign Application Priority Data

Nov. 24, 1987 [SE] Sweden .............................. 8704649-6

[51] Int. Cl.⁵ .............................................. G01S 15/00
[52] U.S. Cl. ........................................... 367/89; 367/99
[58] Field of Search ................................. 367/89–91, 367/99; 73/488; 364/565

[56] References Cited

U.S. PATENT DOCUMENTS 3,991,398 11/1976 Andermo et al. ..................... 367/89
4,041,293 8/1977 Kihlberg ............................... 367/89
4,068,207 1/1978 Andermo et al. ..................... 367/89

FOREIGN PATENT DOCUMENTS 1415440 11/1975 United Kingdom.

Primary Examiner—Daniel T. Pihulic
Attorney, Agent, or Firm—Oblon, Spivak, McClelland, Maier & Neustadt

[57] ABSTRACT

An acoustic log for vessels includes a transmitter which sends a signal within a lobe region and at least two receivers provided for receiving signals reflected from a reference for determining the velocity component of a vessel relative to the reference in the measuring direction determined by the two receivers. The log further includes a transducer device with five crystals serving as transmitter and receiver elements for transmitting and receiving acoustic signals, and being arranged such that combinations in pairs of the crystals define twelve measuring directions regularly distributed around revolution.

5 Claims, 3 Drawing Sheets

FORWARD DIRECTION →

TRANSDUCER DEVICE FOR ACOUSTIC LOG

BACKGROUND OF THE INVENTION

1. Field of the Invention

The present invention relates to a transducer device for an acoustic log, including a transmitter sending a signal within a lobe region and at least two receivers, provided for receiving signals reflected from a reference for determining the velocity component of a vessel relative to the reference in the measuring direction determined by the two receivers.

2. Background of the Discussion

Such devices in which the velocity determination takes place with the use of correlation technique are already known from U.S. Pat. Nos. 3,991,398, 4,041,293 and 4,068,207. Two similar, but mutually time-shifted signals are then generated, the time-shift of which depends on the distance in the measuring direction between the two receivers and on the velocity of the vessel.

The principle for velocity measurement using a correlation technique, which is carried out by the transducer device in accordance with the invention, is described in the above-mentioned patents. A short description of the principle is given below, and for the sake of simplicity, the signals are assumed to be continuous.

Two signals $S_1(t)$ and $S_2(t)$ mutually time-shifted by time $t_0$ (see FIG. 1), and a sample system where the sample is taken with the interval $t_s$ are used.

The following product is calculated for each new sample.

$$E = \Sigma(S_{11} - S_{23})(S_{12} - S_{22})$$

The development of this product gives:

$$\begin{aligned} E &= \Sigma(S_{11}S_{12} - S_{11}S_{22} - S_{23}S_{12}S_{23}S_{22}) \\ &= AKF(t_s) - KKF(t_s) - KKF(t_s) + AKF(t_s), \text{ i.e.} \\ E &= 2AKF(t_s) - 2KKF(t_s/2) \end{aligned}$$

where AKF denotes the autocorrelation function, and KKF denotes the cross correlation function.

These functions are illustrated in FIG. 2. The functions AKF and KKF intersect at the point $t_s = t_0/2$. Another interesting property is that $S_{11} - S_{23} = 0$ for $t_s = t_0/2$, which signifies that the estimate of E has little variance about the intersection point.

A velocity measuring system is provided by the sampling interval $t_s$ being controlled such that AKF=KKF, which results in the velocity v being obtained as $$v = l_0/2t_s$$

where $l_0$ denotes the measuring base, i.e. the distance between the crystals used, as will be described in greater detail below.

In the evaluation of the time delay $t_0$ between the receiver signals the difference between the autocorrelation function and the cross correlation function, AKF-KKF, is thus used. This function is illustrated in FIG. 3 and its zero passage thus gives $t_0/2$.

SUMMARY OF THE INVENTION

The object of the present invention is to provide a new transducer device for an acoustic ship's log operating according to the methods described above, which transducer device is of compact configuration so that the total dimensions will be small, and gives better measuring accuracy while at the same time a minimum of transmitter and receiver crystals are required.

This object is achieved by a transducer device of the kind mentioned in the introduction with the characterizing features stated in claim 1.

With the device according to the invention it is thus possible with only five crystals to measure the velocity in twelve different directions regularly distributed around one revolution, i.e. the directions are successively displaced by 30°, which gives optimum measuring accuracy.

In accordance with an advantageous embodiment of the device in accordance with the invention, the crystal arrangement includes a central crystal, the remaining four crystals being arranged around a circular arc round the central crystal, so that the radii of the circular arc from the central crystal to each of the other crystals successively form the angles of 90°, 60°, 150° and 60° to each other.

A short measuring base is achieved with this realization, i.e. a small distance between two crystals, which increases the measuring accuracy, since the overlapping surface of the lobe regions of the two receiver crystals then will be large. In addition a constant measuring base is obtained for all twelve measuring directions. If a bottom measuring log is realized according to this embodiment, there is also space inside the outer casing of the transducer device for e.g. a relative measurement log.

BRIEF DESCRIPTION OF THE DRAWINGS

An acoustic log with an embodiment of the transducer device in accordance with the invention, chosen as an example, will now be described in more detail in connection with FIGS. 1-7.

In the drawings.

DESCRIPTION OF THE PREFERRED EMBODIMENT

Figure 1:
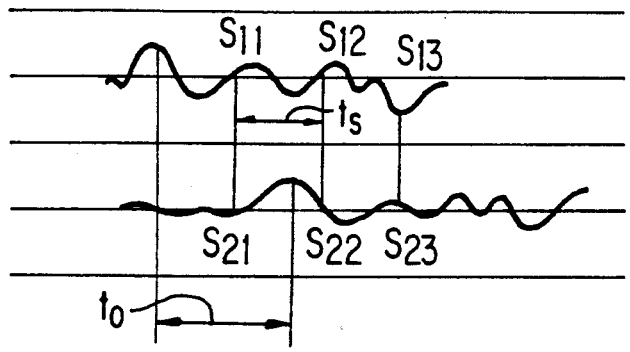
FIG. 1 illustrates two time-dependant, shifted signals for illustrating the correlation calculation required for determining the velocity.
Figure 2:
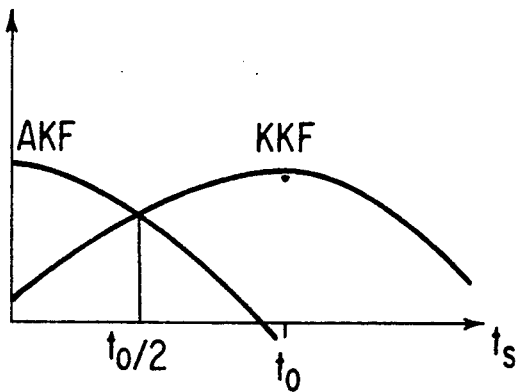
FIG. 2 illustrates examples of the autocorrelation and cross correlation functions.
Figure 3:
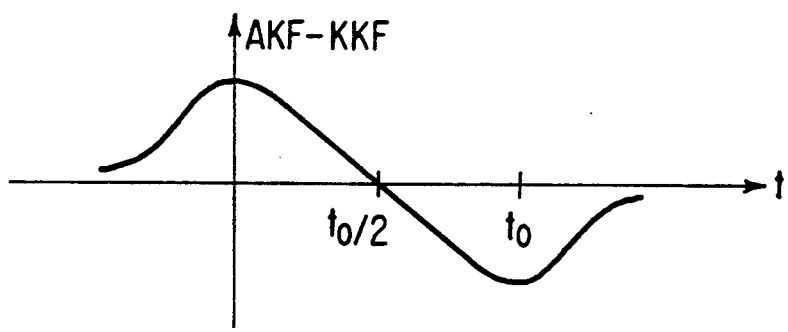
FIG. 3 illustrates the difference between the autocorrelation and cross correlation functions.
Figure 4:
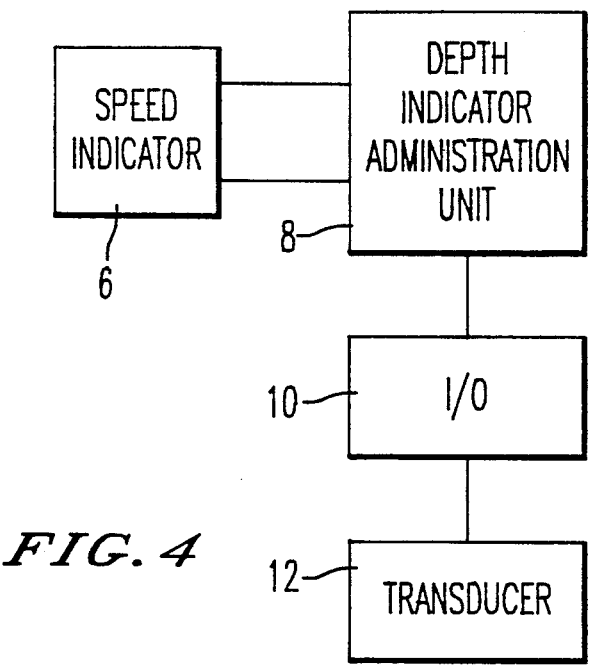
FIG. 4 is a block diagram of an acoustic log with the transducer device in accordance with the invention.

In FIG. 4 there is illustrated a block diagram of an acoustic log with a transducer device in accordance with the invention. The system comprises four function blocks, namely a speed indicator 6, a depth indicator and administration unit 8, a I/O unit 10 for generating transmission pulses and receiving echo pulses, and the transducer device 12. This log operates according to the same principles as the log described in the above-mentioned U.S. Pat. No. 4,041,293 for determining two orthogonal velocity components.

The velocity measuring function is based on the fact that the distance to the reference is known. This distance is therefore measured at the same time as the velocity is measured.

Distance measuring functions as a locked regulating system.

Figure 5:
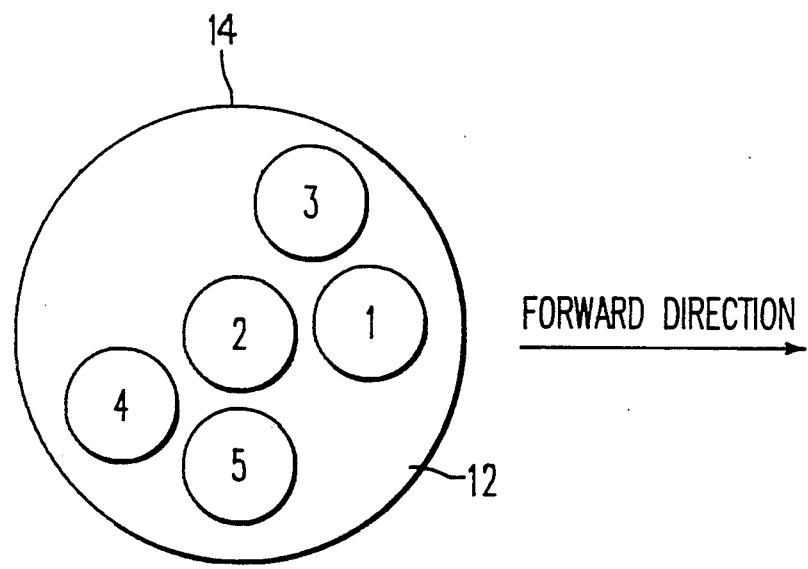
FIG. 5 illustrates a preferred embodiment of the transducer device in accordance with the invention.

The transducer device 12 in accordance with the invention is illustrated in FIG. 5. The device includes five crystals 1-5 arranged in a special pattern so that measuring can be performed in all 30° directions around a revolution.

In embodiment illustrated in FIG. 5 the crystal are numbered 1-5. In such an embodiment, all crystals 1-5 can serve as receiver crystals for the velocity determination while only crystals 1-3 can serve as transmitter crystals. Transmission takes place via the crystals 1, 2 and 3 to obtain a given lobe width. In the illustrated example, the crystals 1 and 2 are assumed to lie in the longitudinal direction of the vessel. The different directions are measured with the following crystal combinations:

| crystals | directions |
|---|---|
| 1-2 | 0°, 180° |
| 1-3 | 120°, 300° |
| 2-3 | 60°, 240° |
| 2-4 | 30°, 210° |
| 5-4 | 150°, 330° |
| 5-2 | 90°, 270° |

As will be seen from FIG. 5, the measuring base, i.e. the distance between the two crystals used each time, is constant and comperatively small, which increases measuring accurancy, as already mentioned.

Figure 6:
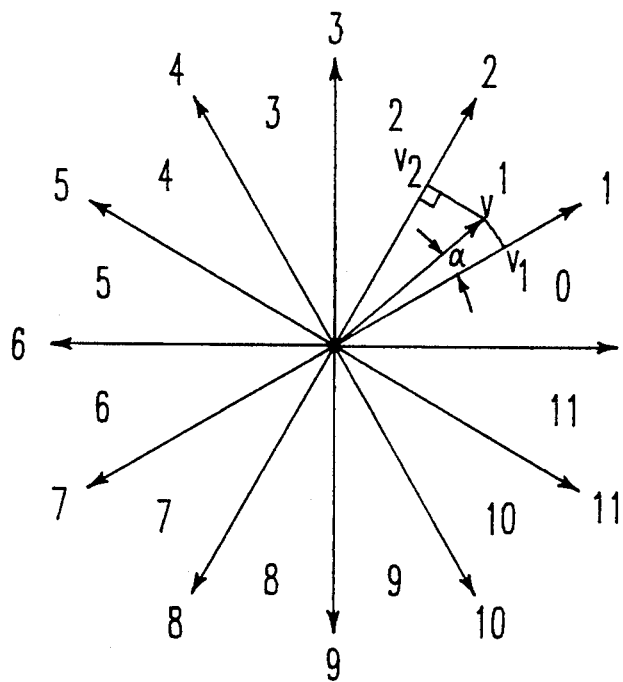
FIG. 6 illustrates the velocity determination using the transducer device of FIG. 5.

Since the velocity can be determined in twelve directions, a revoution can be divided into twelve sectors (see FIG. 6). The velocity in each sector is determined by determining the velocity vector in the two adjacent directions.

The expression for the relationship between the velocity vectors in the longitudinal direction $v_x$ and transverse direction $v_y$ can be determined.

In section 0, the relationship will be $$v_x = v_0$$

$$v_y = \sqrt{3v_0} + 2v_1.$$

Other velocity vectors can also be used for increasing the accurancy.

For depth measurement only the receiver crystals 4 and 5 are utilized.

Figure 7:
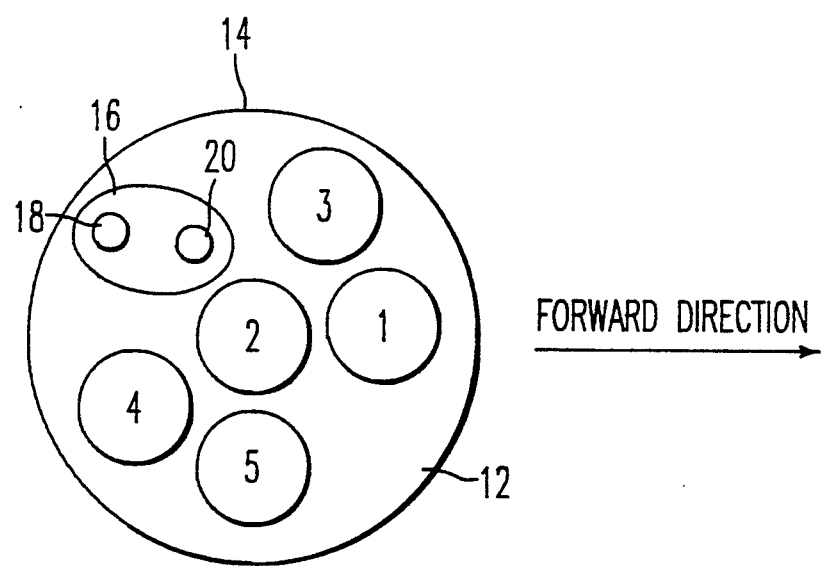
FIG. 7 illustrates an example with transducer devices for two logs arranged in the same outer casing.

In the embodiment illustrated in FIG. 5, crystals 1-5 do not take up much more than half the space within the outer casing 14 of the transducer device 12. Accordingly, if the illustrated and described log is a log for measuring velocities over shallows, there is room inside the casing 14 also for a transducer device 16 having, for example, two crystals 18, 20 for measuring the velocity relative to the water. This embodiment is illustrated in FIG. 7. The two logs then preferably operate at different frequencies.

The embodiment illustrated in FIG. 7 of the second log, e.g. one intended for velocity measurement relative the water, thus comprises two crystals 18, 20 for measuring a velocity component. Of course, the transducer device of the second log can be constructed in a corresponding manner as the one described in connection with FIG. 5. In this way velocity measurement in twelve directions is possible with the second log as well.

Obviously, numerous modifications and variations of the present invention are possible in light of the above teachings. It is therefore to be understood that within the scope of the appended claims, the invention may be practiced otherwise than as specifically described herein.

I claim:

1. A transducer device for an acoustic log, which comprises:
   a transmitter for sending a signal within a lobe region, and
   at least two receivers for receiving signals reflected from a reference for determining the velocity component of a vessel relative to the reference in the measuring direction determined by the two receivers, and
   five crystals which include transmitter and receiver elements for transmitting and receiving acoustic signals wherein said crystals are arranged such that combination of pairs of the crystals define twelve measuring directions regularly distributed around a revolution.

2. A device as claimed in claim 1, wherein the crystal arrangement includes a central crystal and the remaining four crystals are arranged in a substantially circular arc around the central crystal so that the radii of said circular arc from the central crystal to each of the other crystals successively form angles of 90°, 60°, 150° and 60° with respect to each other.

3. A device as claimed in claims 1 or 2, wherein three of said five crystals comprise transmitter and receiver crystals, while two of said five crystals comprise receiver crystals.

4. Device as claimed in claim 3, wherein said crystals formed only as receiver crystals include means for depth measurement.

5. A device as claimed in claims 1 or 2, which comprises a transducer for a second acoustic log and an outer casing for housing said transducer device for a second acoustic log.

* * * * *